United States Patent [19]

Deleryd et al.

[11] Patent Number: 5,383,226
[45] Date of Patent: Jan. 17, 1995

[54] METHOD OF CARRYING OUT LEAK DETECTION OF NUCLEAR FUEL ASSEMBLIES

[75] Inventors: Roland Deleryd, Västerås; Gunnar Stahl, Kolbäck, both of Sweden

[73] Assignee: ABB Atom AB, Västerås, Sweden

[21] Appl. No.: 977,032

[22] Filed: Nov. 16, 1992

[51] Int. Cl.6 .................................................. G21C 17/00
[52] U.S. Cl. ............................. 376/253; 376/250; 376/251
[58] Field of Search .................... 376/253, 250, 251; 976/DIG. 232

[56] References Cited

U.S. PATENT DOCUMENTS

| | | | |
|---|---|---|---|
| 3,762,993 | 10/1973 | Jones | 376/253 |
| 3,801,441 | 4/1974 | Jones | 376/253 |
| 4,016,749 | 4/1977 | Wachter | 73/45.5 |
| 4,082,607 | 4/1978 | Divona | 376/253 |
| 4,374,801 | 2/1983 | Albin | 376/264 |
| 4,443,402 | 4/1984 | Marini et al. | 376/252 |
| 4,650,637 | 3/1987 | Chubb | 376/253 |

*Primary Examiner*—Donald P. Walsh
*Assistant Examiner*—Meena Chelliah
*Attorney, Agent, or Firm*—Watson, Cole, Grindle & Watson

[57] ABSTRACT

During leak detection of fuel assemblies (10) for a boiling water nuclear reactor, water is sucked from an area (12) located above an outlet (11) for water from the fuel assembly and around a gripper (8) for a loading machine (1) for fuel assemblies, which gripper is secured to the fuel assembly above the outlet, while the fuel assembly is lifted in the water (6) in which the fuel assembly is immersed or while the fuel assembly, after having been lifted in the water, is maintained in its lifted position or relowered in the water and while maintaining a flow of the water through the fuel assembly and around the gripper. The sucked-off water is subjected to an analysis with respect to the presence of fission products which, during operation of the reactor, have been formed of the fuel in the fuel assembly.

13 Claims, 1 Drawing Sheet

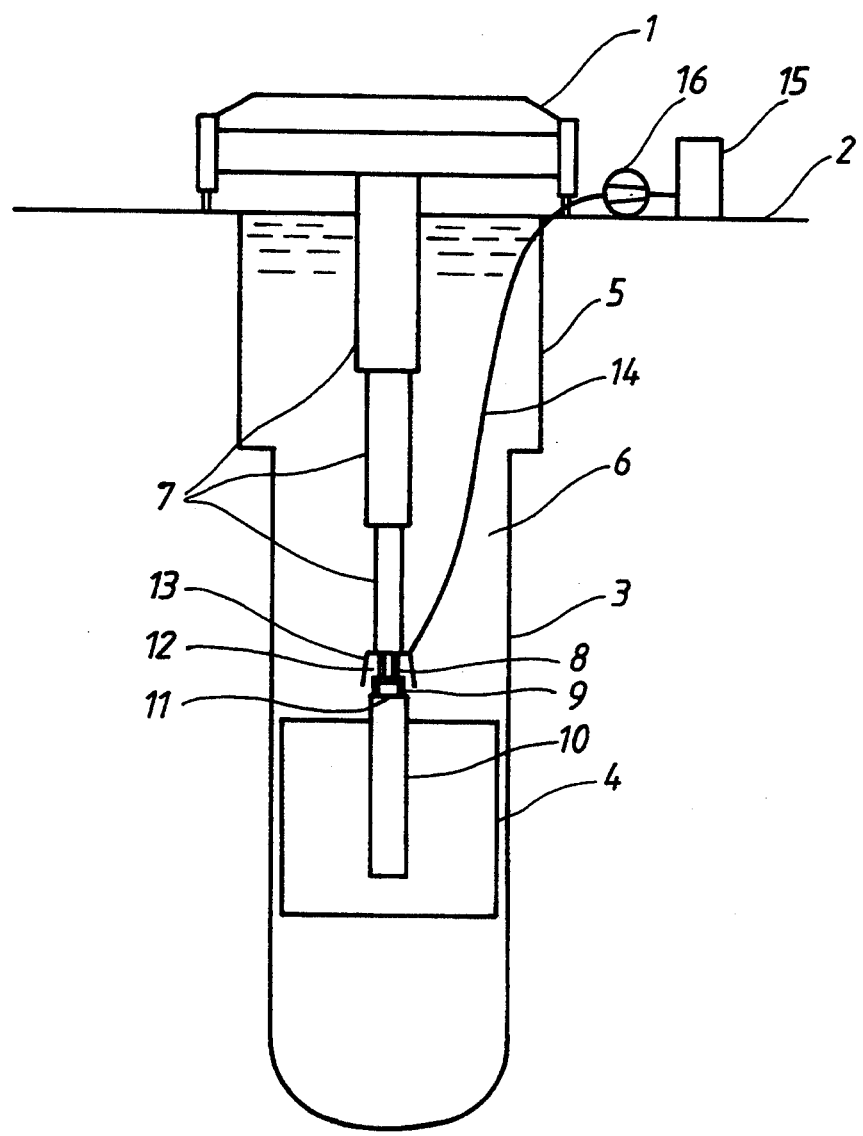

METHOD OF CARRYING OUT LEAK DETECTION OF NUCLEAR FUEL ASSEMBLIES

BACKGROUND OF THE INVENTION

Fuel rods for nuclear reactors are manufactured with extreme accuracy to avoid the occurrence of defects in the cladding which surrounds the fuel and hence leakage of radioactive fission products out into the reactor water in the primary circuit of the reactor. A leakage occurring leads to the reactor water and hence the different parts of the primary circuit being contaminated with the radioactive fission products. When a contamination of the reactor water has been determined or is suspected to have occurred, it is of the utmost importance that the leakage is located so that leaky fuel units can be replaced. In practice, leak detection is not normally carried out on individual fuel rods but on fuel assemblies containing several fuel rods. Also, when replacing fuel units it is fuel assemblies that are replaced and not individual fuel rods.

Leak detection of a suspected fuel assembly takes place by measuring fission products in a gas and/or water sample which is taken from the fuel assembly. To obtain as high a detection degree as possible, measures are therefore taken which lead to pumping of fission products out of the examined fuel assembly. This can be achieved by raising the temperature of the fuel or by reducing the external static pressure around the fuel. The temperature can be raised by stopping the water circulation through the fuel assembly, possibly by taking measures so that the water is completely removed from the fuel assembly. The external static pressure can be reduced by lifting the fuel assembly to a higher level in the reactor water.

SUMMARY OF THE INVENTION

The present invention relates to a method of carrying out leak detection of fuel assemblies for a boiling water nuclear reactor. The fuel assemblies in a boiling water reactor comprise a plurality of fuel rods, which are usually arranged in a lattice of square cross section. Each fuel rod contains a large number of fuel pellets, usually pellets of uranium dioxide, which are stacked on top of each other in a cladding tube, usually of Zircaloy. The fuel rods are arranged between a bottom tie plate and a top tie plate and are surrounded in the lateral direction by a fuel channel which is normally also of Zircaloy and has a square cross section. The fuel rods are maintained spaced from each other in the lateral direction by means of spacers, placed at suitable distances in the vertical direction. When the reactor is in operation, the reactor water is led in through the bottom tie plate of the respective fuel assembly and, after having passed the space in the fuel channel outside the fuel rods, out through the top tie plate of the assembly.

The method according to the present invention, which is carried out with the fuel assemblies immersed in water, is well suited for use under operating conditions and can be carried out with a minimum time expenditure. What characterizes the invention is that, from an area located above the outlet for water from the fuel assembly which is to be detected for leaks and around a gripper which is arranged in the lower end of a lifting rod of telescopic design for a loading machine for fuel assemblies and which is secured to the fuel assembly above the outlet, water is sucked off while the fuel assembly is lifted in the water or while the fuel assembly, after having been lifted in the water, is maintained in its lifted position or relowered in the water and while maintaining a flow of the water through the fuel assembly and around the gripper, and that the sucked-off water is subjected to an analysis with respect to the presence of fission products which have formed from the fuel in the fuel assembly during operation of the reactor. The sucked-off water may contain both fission products dissolved in the water and undissolved fission products occurring in vapour phase. The analysis is performed in a conventional manner either with continuously recording instruments or by collection in vessels for analysis in separate equipment.

The best sensitivity of measurement is obtained at the maximally available lifting height, that is, the lifting height from the position of the fuel assembly in the reactor core to the highest position of the gripper. Sufficient sensitivity of measurement is, however, obtained at lower lifting heights. If the measurement is performed when the fuel assembly, after having been lifted in the water, is maintained in its lifted position, a lifting height is preferably used which amounts to at least the length of a fuel assembly.

According to one embodiment of the invention, the area above the fuel assembly and around the gripper is shielded off from the surroundings by a cap-like device to counteract the spreading of the water from the fuel assembly outside the area and loss of the water with fission products for analysis.

The leak detection is preferably carried out in connection with the reactor being shut down for refuelling. When the burnup in a reactor has progressed so far that the least acceptable reactivity margin has been attained, a partial recharge is carried out. During the partial recharge of a boiling-water reactor, it is possible, for example, to exchange one-fifth of the fuel every operating year (or every other suitable operating period). Some of the fuel assemblies are thereby taken out of the reactor core and replaced, usually after appropriate relocation of some of the remaining fuel assemblies within the core, by new fuel assemblies. During leak detection of a fuel assembly which is to maintain its location in the core, the fuel assembly is lifted to the desired level in the reactor water and is returned to its previous location after completed leak detection. During leak detection of a fuel assembly which is to be relocated, the leak detection is carried out in connection with the fuel assembly being lifted from its location, whereupon, after completed leak detection, it is positioned in its new location in the core. During leak detection of a fuel assembly which is to be removed from the core, the leak detection is carried out in connection with the fuel assembly being lifted in the reactor water and before it is placed in a storage pool close to the reactor vessel.

The invention will be explained in greater detail by describing an embodiment with reference to the accompanying FIGURE, which schematically shows a device for carrying the method according to the invention.

In the FIGURE, 1 designates a loading machine for fuel assemblies for a boiling reactor, 2 the reactor hall floor along which the loading machine is movable, 3 the reactor vessel 3, 4 the reactor core, 5 a pool located above the reactor vessel with reactor water, and 6 the reactor water in the reactor vessel and in the pool. The loading machine is provided with a lifting rod 7 of telescopic design. The lower end of the lifting rod is provided with a gripper 8 which is adapted to grip a lifting handle 9 on the fuel assembly 10 which in the illustrated case is being lifted out of the reactor core. The lifting handle is located above the outlet 11 of the fuel assembly for water. The outlet is arranged in the top tie plate 5 of the fuel assembly. The area 12 above the outlet and around the gripper 8 is shielded from the environment by means of a cap-like device 13, which prevents water which has passed the fuel assembly from spreading outside the area 12, which would mean that leaked-out fission products would be lost for the analysis. The area 12 is not closed to the environment but communicates openly with the downwardly-facing opening at the cap-like device. From the area 12 a hose 14 or other conduit extends to the detecting equipment 15 which is located on the reactor hall floor or on the loading machine. The conduit 14 also includes a pump 16 by means of which the water is sucked from the area 12. When the fuel assembly is lifted with the lifting rod, the reactor water is caused to flow through the fuel assembly and to flush the gripper. This is also the case when the fuel assembly, after having been lifted to a definite position in the vertical direction, is retained in this position or relowered in the water during the analysis of leaked-out fission gases. The reactor water can be caused to flow through the fuel assembly by maintaining the reactor water circulation flow normally upheld during shutdown periods. The fuel assembly is all the time located below the lifting rod and its telescope-shaped parts. In the FIGURE the lateral dimensions of the lifting rod and of the fuel assembly are greatly exaggerated to render the FIGURE clear.

The invention can also be applied to leak detection of fuel assemblies which are located in storage pools for fuel.

We claim:

1. A method of carrying out leak detection of a fuel assembly for a boiling water nuclear reactor, said fuel assembly being immersed in water, wherein from an area located above an outlet for water in a top tie plate of the fuel assembly and around a gripper which is arranged in the lower end of a lifting rod of telescopic design for a loading machine for fuel assemblies and which is secured to the fuel assembly above the outlet, water is sucked off while the fuel assembly is lifted in the water, and wherein the sucked-off water is subjected to an analysis with respect to the presence of fission products which have been formed from fuel in the fuel assembly.

2. A method according to claim 1, wherein the area located above the outlet of the fuel assembly (10) for water and around the gripper is shielded from the environment by means of a cap-like device.

3. A method according to claim 1 wherein the leak detection is carried out in connection with the reactor being shut down for refuelling.

4. A method for detecting leakage of fission products from a fuel rod of a fuel assembly used in a boiling water nuclear reactor, the fuel assembly including a top tie plate having an outlet opening for reactor water, a flow of reactor water passing upwardly through the fuel assembly and through the outlet opening while immersed in a pool of reactor water, said method comprising the steps of:

(a) positioning a loading machine having a telescopic lifting arm with a gripper above the fuel assembly, (b) extending the lifting arm downwardly and gripping the fuel assembly with the gripper, (c) contracting the lifting arm so as to lift the fuel assembly upwardly within the pool of reactor water while maintaining the flow of reactor water passing upwardly through said fuel assembly and through the outlet opening, (d) sucking a sample of reactor water which has passed upwardly through the fuel assembly and through the outlet opening thereof to a remote location, and (e) analyzing said water sample at said remote location for the presence of fission products.

5. The method of claim 4, wherein said loading machine includes a shield surrounding said gripper and wherein in step (d) said sample is sucked from within said shield.

6. The method of claim 4, including between steps (c) and (d) a step of extending the lifting arm downwardly to lower the fuel assembly with respect to said pool of reactor water.

7. A method for detecting leakage of fission products from a fuel rod of a fuel assembly used in a boiling water nuclear reactor, the fuel assembly including a top tie plate having an outlet opening for reactor water, a flow of reactor water passing upwardly through the fuel assembly and through the outlet opening while immersed in a pool of reactor water, said method comprising the steps of:

(a) positioning a loading machine having a telescopic lifting arm with a gripper above the fuel assembly, (b) gripping the fuel assembly with the gripper, (c) sucking a sample of reactor water which has passed upwardly through the fuel assembly and through the outlet opening thereof to a remote location while maintaining the flow of reactor water through said fuel assembly and through said outlet opening, and (d) analyzing said water sample at said remote location for the presence of fission products.

8. The method in claim 7, wherein step (c) is accomplished while transporting the fuel assembly.

9. The method in claim 7, wherein step (c) is accomplished while the fuel assembly is maintained in a lifted position.

10. The method in claim 7, wherein said loading machine includes a shield surrounding said gripper and wherein in step (c) said sample is sucked from within said shield.

11. The method according to claim 7, wherein the leak detection is carried out while the reactor is shut down for refueling.

12. A method of carrying out leak detection of a fuel assembly for a boiling water nuclear reactor, said fuel assembly being immersed in water, wherein from an area located above an outlet for water in a top tie plate of the fuel assembly and around a gripper which is arranged in the lower end of a lifting rod of telescopic design for a loading machine for fuel assemblies and which is secured to the fuel assembly above the outlet, water is sucked off while the fuel assembly, after having been lifted in the water, is maintained in its lifted position, and wherein the sucked-off water is subjected to an analysis with respect to the presence of fission products which have been formed from fuel in the fuel assembly.

13. A method of carrying out leak detection of a fuel assembly for a boiling water nuclear reactor, said fuel assembly being immersed in water, wherein from an area located above an outlet for water in a top tie plate of the fuel assembly and around a gripper which is arranged in the lower end of a lifting rod of telescopic design for a loading machine for fuel assemblies and which is secured to the fuel assembly above the outlet, water is sucked off while the fuel assembly, after having been lifted in the water, is relowered in the water, and wherein the sucked-off water is subjected to an analysis with respect to the presence of fission products which have been formed from fuel in the fuel assembly.

* * * * *